United States Patent
Yang

(10) Patent No.: US 6,698,912 B2
(45) Date of Patent: Mar. 2, 2004

(54) HALOED VEHICLE LIGHT

(76) Inventor: Chiu-Ling Yang, P.O. Box No. 6-57, Chung-Ho, Taipei 235 (TW)

( * ) Notice: Subject to any disclaimer, the term of this patent is extended or adjusted under 35 U.S.C. 154(b) by 3 days.

(21) Appl. No.: 10/086,564

(22) Filed: Mar. 4, 2002

(65) Prior Publication Data

US 2003/0165064 A1 Sep. 4, 2003

(51) Int. Cl.⁷ .................................................. F21V 7/00
(52) U.S. Cl. ...................... 362/516; 362/545; 362/240; 362/247; 362/539; 362/248; 362/241
(58) Field of Search .............................. 362/543, 544, 362/545, 240, 247, 517, 297, 346, 351, 53 P, 248, 241, 516

(56) References Cited

U.S. PATENT DOCUMENTS

| | | | | |
|---|---|---|---|---|
| 5,126,924 A | * | 6/1992 | Watanabe | 362/61 |
| 5,353,203 A | * | 10/1994 | Bertling et al. | 362/61 |
| 5,353,204 A | * | 10/1994 | Kawamura | 362/61 |
| 5,521,798 A | * | 5/1996 | Bertling et al. | 362/61 |
| 5,595,438 A | * | 1/1997 | Burd | 362/228 |
| 6,004,013 A | * | 12/1999 | Raillard | 362/509 |
| 6,497,506 B1 | * | 12/2002 | Kakizoe | 362/544 |

* cited by examiner

*Primary Examiner*—Sandra O'Shea
*Assistant Examiner*—Sharon Payne

(57) ABSTRACT

The present invention of a haloed vehicle light mainly includes a primary light-emitting socket, a secondary light-emitting socket, an outer reflector, an inner reflector and a light-permeable shield; the inner reflector is disposed inside the outer reflector and both of them are spaced at a proper interval distance; both of the primary and secondary light-emitting sockets are disposed with a light-emitting body; a projector with the function of refraction can be additionally disposed inside the inner reflector; a luminous washer can be additionally disposed in front of the frame of the inner reflector; a plurality of ring-shaped and light-reflecting saw teeth are disposed on the inner wall of the light-permeable shield incorporating with the luminous washer; the vehicle light of the present invention has a central light area, an outer circular light area, a luminous area and is capable of generating various applicative functions.

5 Claims, 6 Drawing Sheets

HALOED VEHICLE LIGHT

BACKGROUND OF THE INVENTION

Generally, most of the vehicle lights have either separated or independent primary and secondary lights; they might be disposed right or left inside one vehicle light and incorporate with light-emitting bodies of different powers or light-permeable shields in different colors to reach dual effects of illuminating and having the function of a warning light, a fog light, a dusk light or an auxiliary light; a contemporary vehicle light is required not only to have a suitable shape, illuminating and warning functions, but also to focus on lighting aesthetics; the vehicle light has occupied a major role in the technological aesthetics of automobiles; it has been compared to as a pair of beautiful eyes always attracting attention and outstanding; therefore, the style of the vehicle light has become the focus of attention and each automobile manufactory usually presents vehicle lights in different styles; actually, the unique features of the vehicle lights enable the recognition of the product line, the manufactory and the age of an automobile.

In view of the mentioned reasons, how to design a vehicle light capable of breaking through the conventional structure and style to produce extraordinary effect of lighting aesthetics was the primary target of the present invention.

SUMMARY OF THE INVENTION

A haloed vehicle light comprises an inner reflector disposed inside an outer reflector and both of them are spaced at a proper distance; a light-permeable shield is sealed in front of the inner and outer reflectors; the primary light-emitting socket is fixed behind the outer reflector and inside the inner reflector; the secondary light-emitting socket is fixed behind the outer reflector and between the inner and the outer reflectors; since both of the primary and the secondary light-emitting sockets are disposed with a light-emitting body, when the primary light-emitting body emits the light, the central area of the vehicle light generate bright radiant effect; when the secondary light-emitting body emits the light, the outer circular area of the vehicle light generates an effect of bright halo; when both of the primary and secondary light-emitting bodies emit the light, the central and the outer circular areas of the vehicle light synchronously emit light and generate an effect of bright halo in dual colors; furthermore, a luminous washer is additionally disposed in front of the frame of the inner reflector and a circular light-reflecting wall is additionally disposed on the inner wall of the light-permeable shield to allow the off vehicle light to be able to present a halo for warning effect.

To enable a further understanding of the structural features and the technical contents of the present invention, the brief description of the drawings below is followed by the detailed description of the preferred embodiment.

DETAILED DESCRIPTION OF THE PREFERRED EMBODIMENTS

Figure 1:
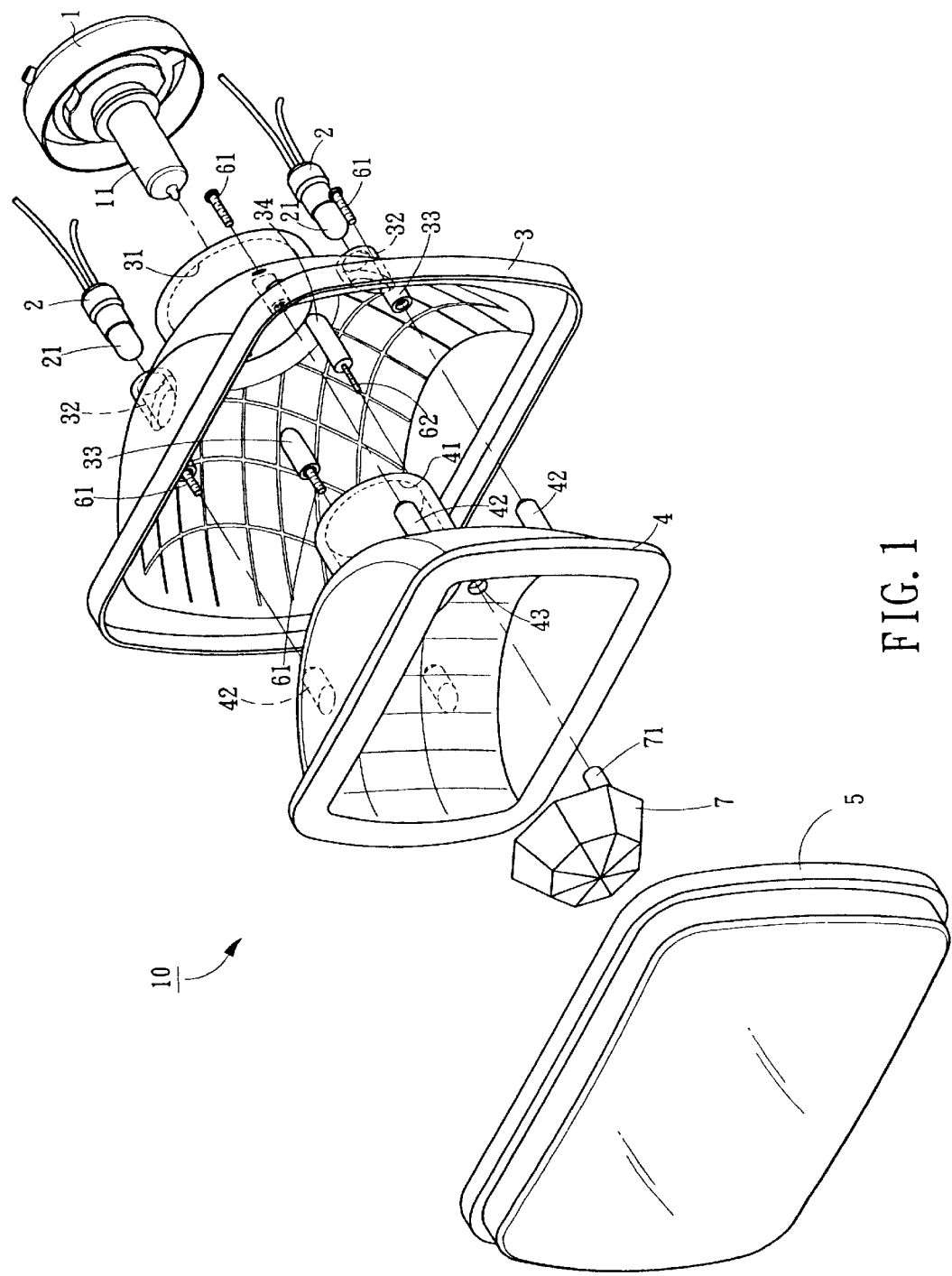
FIG. 1 is a pictorial and exploded drawing of the structure of a vehicle light of the present invention.
Figure 2:
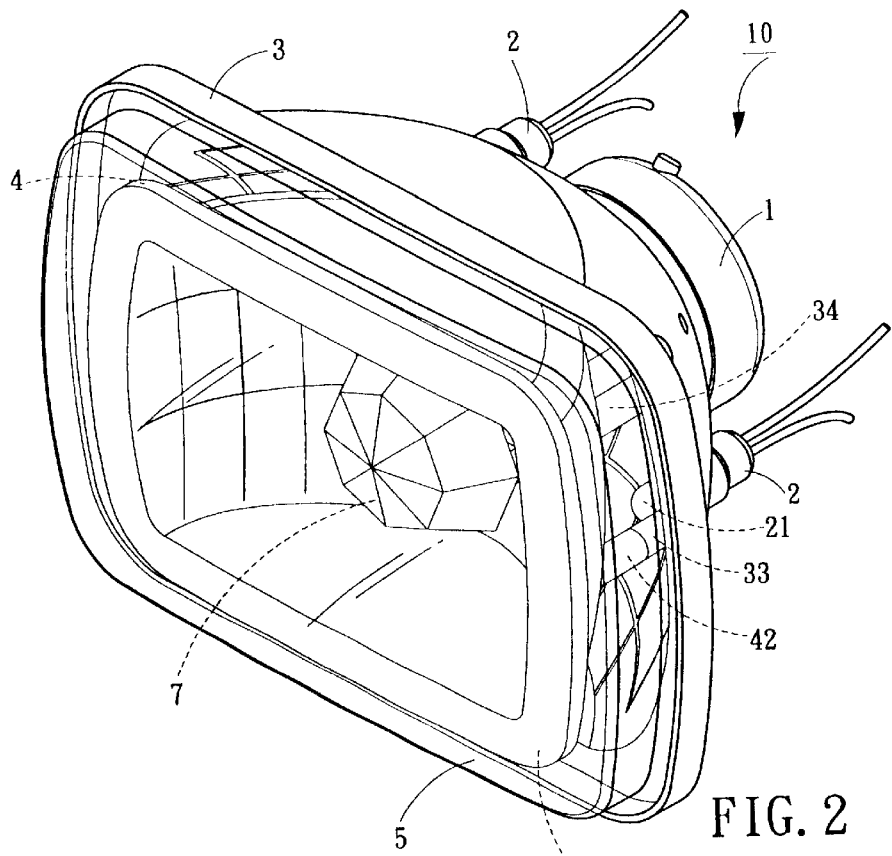
FIG. 2 is a pictorial drawing of the assembled structure of the vehicle light in FIG. 1.

Referring to FIG. 1, the pictorial and exploded drawing of the structure of a vehicle light of the present invention, as indicated, the vehicle light (10) structure comprises a primary light-emitting socket (1), one to a plurality of secondary light-emitting sockets (2), an outer reflector (3), an inner reflector (4) and a light-emitting shield (5); wherein the primary and the secondary light-emitting sockets (1, 2) are both disposed behind the outer reflector (3); the outer diameter of the inner reflector (4) is shorter that the inner diameter of the outer reflector (3); the inner reflector (4) is fixed inside the outer reflector (3); the light-permeable shield is sealed at the front aspects of the inner and the outer reflectors (3, 4); the assembled pictorial and outer image is shown in FIG. 2.

Figure 3:
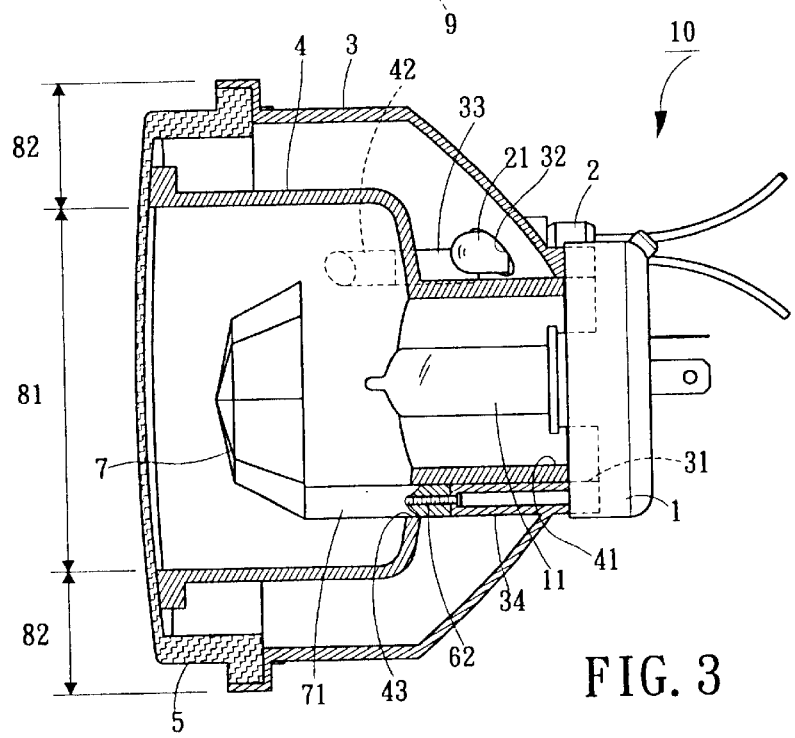
FIG. 3 is an entire cross-sectional drawing of the vehicle light in FIG. 1.

Referring to FIGS. 1 and 3, wherein, FIG. 3 is the entire cross-sectional drawing of the vehicle light of the present invention; as indicated, a primary light-emitting body (11) is disposed at the front end of the primary light-emitting socket (1); the secondary light-emitting body (21) is disposed at the front end of the secondary light-emitting socket (2); a central through hole (31) and at least one secondary socket hole (32) are disposed on the outer reflector (3); furthermore, in order to keep an proper interval distance between the inner and the outer reflectors (3, 4), a plurality of fastening posts (33, 42) are disposed inbetween and screws (61) are threaded therein to fasten and assemble these two reflectors (3, 4); the outer diameter of the inner reflector (4) is shorter than that of the inner diameter of the outer reflector (3); a central primary socket hole (41) and the central through hole (31) incorporate with each other symmetrically; when the primary light-emitting socket (1) is disposed inside the central through hole (31) of the outer reflector (3), it enables the primary light-emitting body (11) to enter into the central primary socket hole (41) of the inner reflector (4); when the secondary light-emitting socket (2) is disposed in the secondary socket hole (32) of the outer reflector (3), it enables the secondary light-emitting body (21) enter into the outer reflector (3) but locate between the inner and the outer reflectors (3, 4); when more than two secondary light-emitting sockets (2) are disposed, they are preferred to be disposed at equiangular degree or equidistance on the four peripheral sides of the primary light-emitting socket (1).

Furthermore, a projector (7) can be additionally disposed inside the inner reflector (4); after penetrating through the preset through hole (43) on the inner reflector (4), a supporting post (71) of the said projector (7) symmetrically incorporates with a preset supporting post (34) of the outer reflector (3); screws (62) fasten and assemble these two supporting posts (71, 34) to further allow an proper interval distance to be maintained between the projector (7) and the inner reflector (4) as well as in front of the primary light-emitting body (11); therefore, when the light ray of the primary light-emitting body (11) projects on the arcuate inner wall of the projector (7), it reflects backwardly to the inner reflector (4) after the first refraction; then, after the second refraction produced by the arcuate inner wall of the inner reflector (4), the light ray permeates through the light-permeable shield (5) and radiates outwardly; the outer rim of the light-permeating shield (5) inserts with the outer reflector (3) for fastening but parallelly plane-contacts the inner reflector (4).

Figure 4:
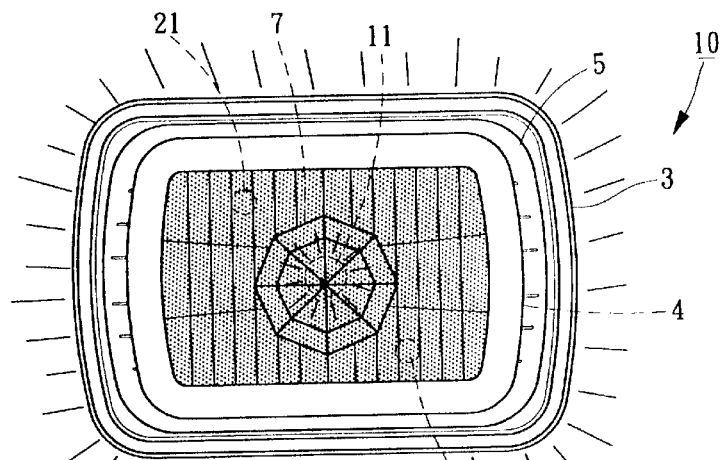
FIG. 4 is a schematic drawing of the light-emitting central area of the vehicle light in FIG. 1.

Since the vehicle light (10) has separate inner and outer reflectors (3, 4), when the primary light-emitting body (11) emits light, the light source permeates the inner reflector (4) and penetrates the light-permeable shield (5) to radiate outwardly; the light-emitting area is limited within the area of the inner reflector (4); that means a central area (81) is the light-emitting section and an outer circular area (82)outside the inner reflector (4) is not a light-emitting section; viewing the vehicle light (10) from the front side, as shown in FIG. 4, one will find that only the central area (81) of the inner reflector (4) generates bright illuminating effect and that is suitable for driving in the night.

Figure 5:
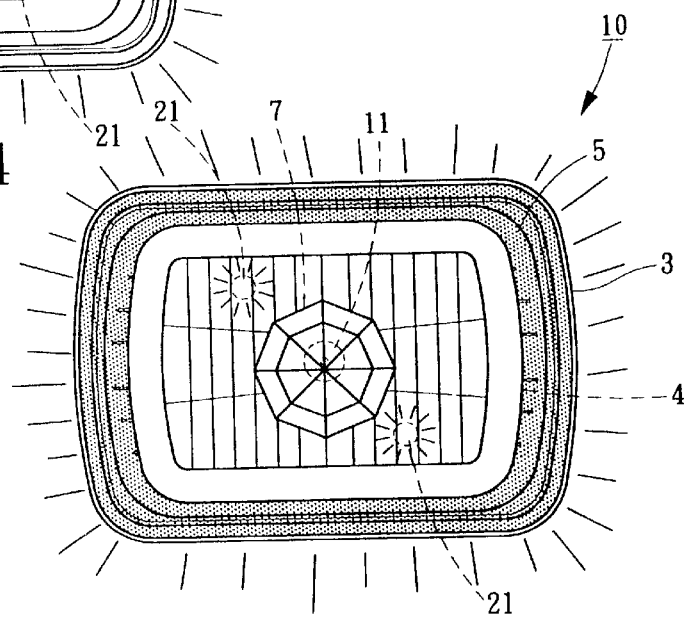
FIG. 5 is a schematic drawing of the light-emitting outer circular area of the vehicle light in FIG. 1.

When the secondary light-emitting body (21) emits light, the light source permeates through the outer reflector (3) and projects toward the light-permeable shield (5); since the inner reflector (4) blocks the light source, the central area (81) of the inner reflector (4) doesn't emit light and only the outer circular area (82) outside the inner reflector (4) allows the light source to permeate outwardly; viewing the vehicle light (10) from the front side, as shown in FIG. 5, an effect of outer circular and bright halo is generated; since colored light-emitting body can be used for the secondary light-emitting body (21), the outer circular halo can become a blue, yellow or red halo; it provides warning effect for curb parking or it can be used as a dusk light.

Figure 6:
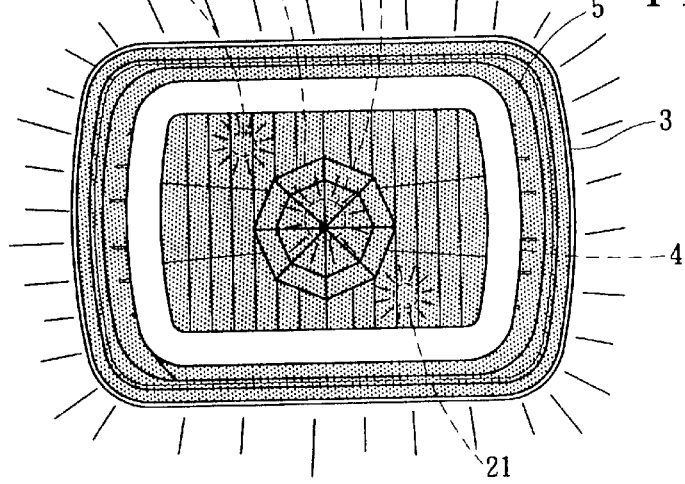
FIG. 6 is a schematic drawing of the central and outer circular areas synchronously emitting light of the vehicle light in FIG. 1.

When both the primary and the secondary light-emitting bodies (11, 21) emit light synchronously, it enables the center and the outer circle to emit bright radiance at the same time; since the color of the lights of the primary and the secondary light-emitting bodies (11, 21) are different, the luminosities are obviously different; viewing the vehicle light (10) from the front side, as shown in FIG. 6, the vehicle light (10) presents brilliant dual colors; the radiance generated by the primary light-emitting body (11) at this time is used as the main illuminating light for driving while the halo generated by the secondary light-emitting body (21) is used for encountering other vehicle light or as an auxiliary light.

Figure 7:
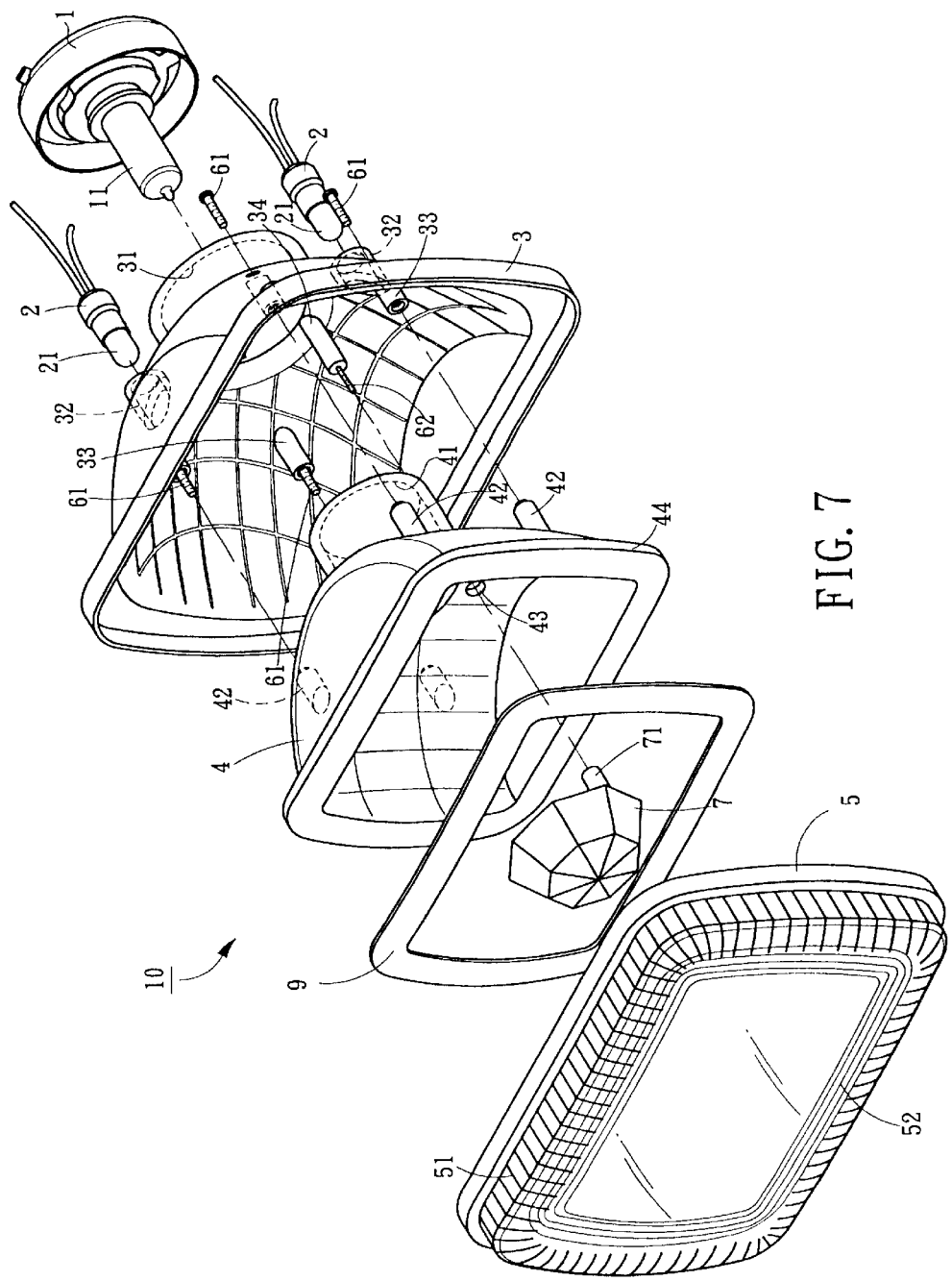
FIG. 7 is a pictorial and exploded drawing of another vehicle light structure of the present invention.
Figure 10:
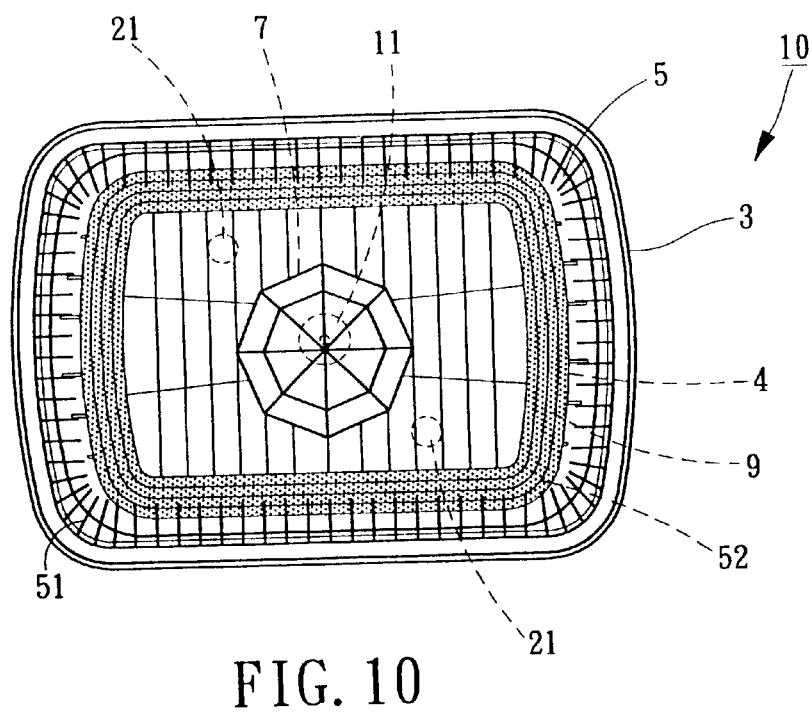
FIG. 10 is a schematic drawing of the luminous vehicle light not emitting light in FIG. 7.
Figure 11:
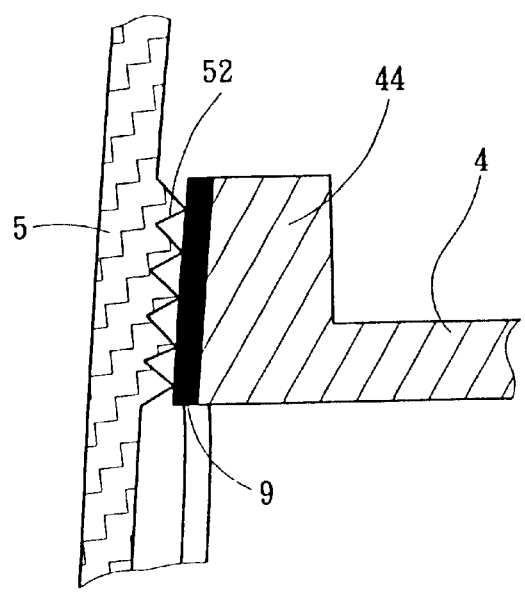
FIG. 11 is a drawing of a partial cutting-plane of the vehicle light in FIG. 7.

FIG. 7 indicates the pictorial and exploded drawing of another vehicle light structure of the present invention; the difference between FIG. 7 and FIG. 1 is that a luminous washer (9) is additionally disposed in the front of the frame (44) of the inner reflector (4); the inner wall of the light-permeable shield (5), incorporating with the luminous washer (9), is disposed with a circular light-reflecting wall (52) which is formed by a plurality of triangular saw teeth, as shown in FIG. 10; with the luminous washer (9), the combination between the inner reflector (4) and the light-permeable shield (5) becomes more firm; furthermore, a light shading line (51) is additionally disposed on the outer circle of the light-emitting shield (5) for preventing the strong light to refract outwardly from the lateral side of the vehicle light (10).

Figure 8:
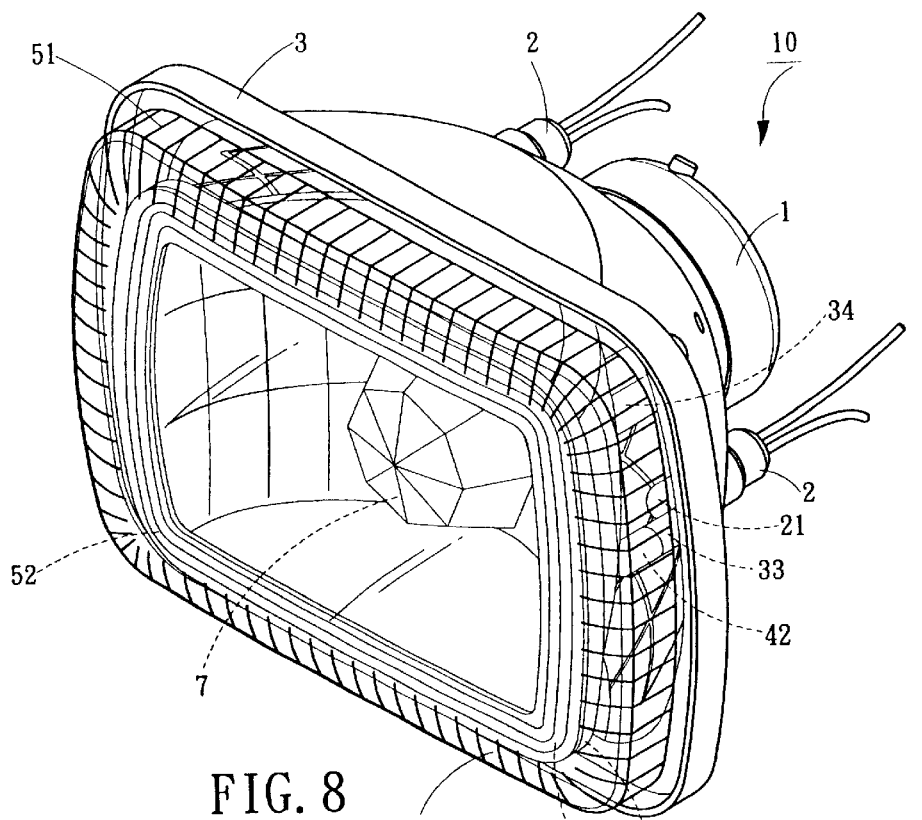
FIG. 8 is a pictorial drawing of the assembled vehicle light structure in FIG. 7.
Figure 9:
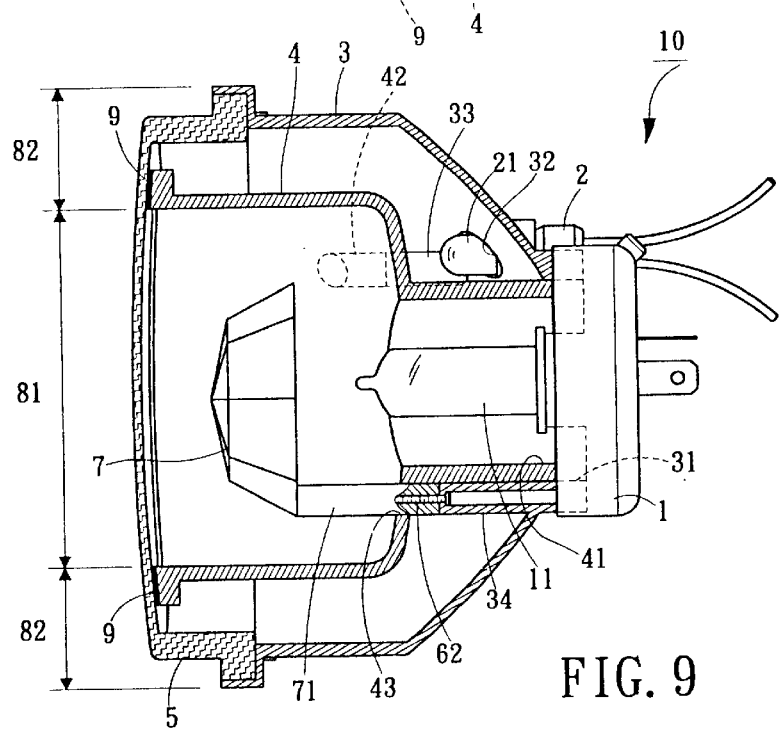
FIG. 9 is an entire cross-sectional drawing of the vehicle light in FIG. 7.

The indications in FIGS. 8 and 9 are approximately the same as that in FIGS. 2 and 3; the only difference is that a luminous washer (9) is additionally disposed onto the vehicle light (10) and the light-permeable shield (5) is additionally disposed with a light shading line (51) and a light-reflecting wall (52); therefore, when the vehicle light (10) is turned off, the luminous washer (9) radiates the absorbed light ray to generate a luminous light effect; the luminous light forms a warning halo through the light collecting function of the light-reflecting wall (52) of the light-permeable shield (5), as shown in FIG. 10.

Therefore, the embodiment of the present invention is capable of enabling a vehicle light to have central light section, outer circular light section and luminous light section; through the individual or synchronous light-emitting of the primary and secondary light-emitting bodies, effects of different applications can be achieved; when the vehicle light is turned off, the luminous washer forms luminous halo; in summation, the vehicle light of the present invention is capable of generating unique light variations and aesthetics so as to form various styles of vehicle lights.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A haloed vehicle light comprises:
    an outer reflector;
    an inner reflector, smaller than the outer reflector and disposed inside the outer reflector; both of them are spaced at a proper interval distance;
    a light-permeable shield, disposed in front of the inner and outer reflectors and used to seal the said two reflectors;
    a primary light-emitting socket, disposed behind the outer reflector and with a primary light-emitting body inside the outer reflector;
    at least one secondary light-emitting socket, disposed behind the outer reflector and with a secondary light-emitting body situated between the inner and the outer reflectors;
    under the division of the inner and the outer reflectors, the said vehicle light forms a central and an outer circular light-emitting sections; with the incorporation of the primary and secondary light-emitting sockets.

2. A haloed vehicle light according to claim 1, wherein, a luminous washer is additionally disposed in front of the frame of the inner reflector.

3. A haloed vehicle light according to claim 2, wherein, inner wall contacted by the light-permeable shield and the luminous washer is disposed with a light-reflecting, wall for collecting light.

4. A haloed vehicle light according to claim 1 or claim 2, wherein, a projector is additionally disposed inside the inner reflector and the arcuate wall plane thereof is used to allow the light source of the primary light-emitting body to have two refractive effects.

5. A haloed vehicle light according to claim 1, wherein, a supporting post is fitted between the inner and outer reflectors for generating a proper interval distance inbetween.

* * * * *